(12) United States Patent  
Stafford et al.

(10) Patent No.: US 9,044,675 B2  
(45) Date of Patent: Jun. 2, 2015

(54) AUTOMATED VIDEO GAME RATING

(75) Inventors: Jeffrey Roger Stafford, Redwood City, CA (US); Steven Osman, San Francisco, CA (US)

(73) Assignee: SONY COMPUTER ENTERTAINMENT INC., Tokyo (JP)

( * ) Notice: Subject to any disclaimer, the term of this patent is extended or adjusted under 35 U.S.C. 154(b) by 469 days.

(21) Appl. No.: 12/948,067

(22) Filed: Nov. 17, 2010

(65) Prior Publication Data

US 2012/0122592 A1    May 17, 2012

(51) Int. Cl.
  *G06F 17/00* (2006.01)
  *A63F 13/30* (2014.01)
  *G06Q 30/02* (2012.01)

(52) U.S. Cl.
  CPC ........... *A63F 13/12* (2013.01); *A63F 2300/535* (2013.01); *A63F 2300/552* (2013.01); *A63F 2300/6027* (2013.01); *G06Q 30/0282* (2013.01)

(58) Field of Classification Search
  USPC ......................................... 463/16–25, 43, 44
  See application file for complete search history.

(56) References Cited

U.S. PATENT DOCUMENTS

| | | | | |
|---|---|---|---|---|
| 6,041,311 | A * | 3/2000 | Chislenko et al. | 705/26.7 |
| 6,049,777 | A * | 4/2000 | Sheena et al. | 705/7.32 |
| 6,438,579 | B1 * | 8/2002 | Hosken | 709/203 |
| 6,801,909 | B2 * | 10/2004 | Delgado et al. | 1/1 |
| 6,947,922 | B1 * | 9/2005 | Glance | 705/26.1 |
| 6,968,334 | B2 * | 11/2005 | Salmenkaita et al. | 1/1 |
| 7,412,202 | B2 | 8/2008 | Gutta et al. | |
| 7,440,943 | B2 | 10/2008 | Grasso et al. | |
| 7,614,955 | B2 | 11/2009 | Farnham et al. | |
| 2002/0052873 | A1 * | 5/2002 | Delgado et al. | 707/7 |
| 2002/0199194 | A1 * | 12/2002 | Ali | 725/46 |
| 2007/0054738 | A1 * | 3/2007 | Muir | 463/42 |
| 2007/0072678 | A1 | 3/2007 | Dagres | |
| 2007/0078669 | A1 | 4/2007 | Dave et al. | |
| 2008/0032787 | A1 | 2/2008 | Low et al. | |
| 2008/0040748 | A1 | 2/2008 | Miyaki | |
| 2009/0163183 | A1 * | 6/2009 | O'Donoghue et al. | 455/414.1 |

FOREIGN PATENT DOCUMENTS

| | | |
|---|---|---|
| CN | 101180649 | 5/2008 |
| CN | 101193346 | 6/2008 |

OTHER PUBLICATIONS

International Search Report and Written Opinion in International Application No. PCT/US2011/061093, mailed Mar. 26, 2012.
Office Action dated Nov. 15, 2014 issued in CN Appl. No. 201180065215.6.

* cited by examiner

*Primary Examiner* — Ronald Laneau
(74) *Attorney, Agent, or Firm* — Nixon Peabody LLP; Khaled Shami

(57) ABSTRACT

In one embodiment described herein, an automated rating system for an electronic game includes a collector configured to collect game data pertaining to the electronic game and to collect implicit user data pertaining to one or more users, a rating processor configured to rate the game based on the collected game data and implicit user data, and a recommender configured to provide a recommendation as a function of the operation of the game rating.

40 Claims, 8 Drawing Sheets

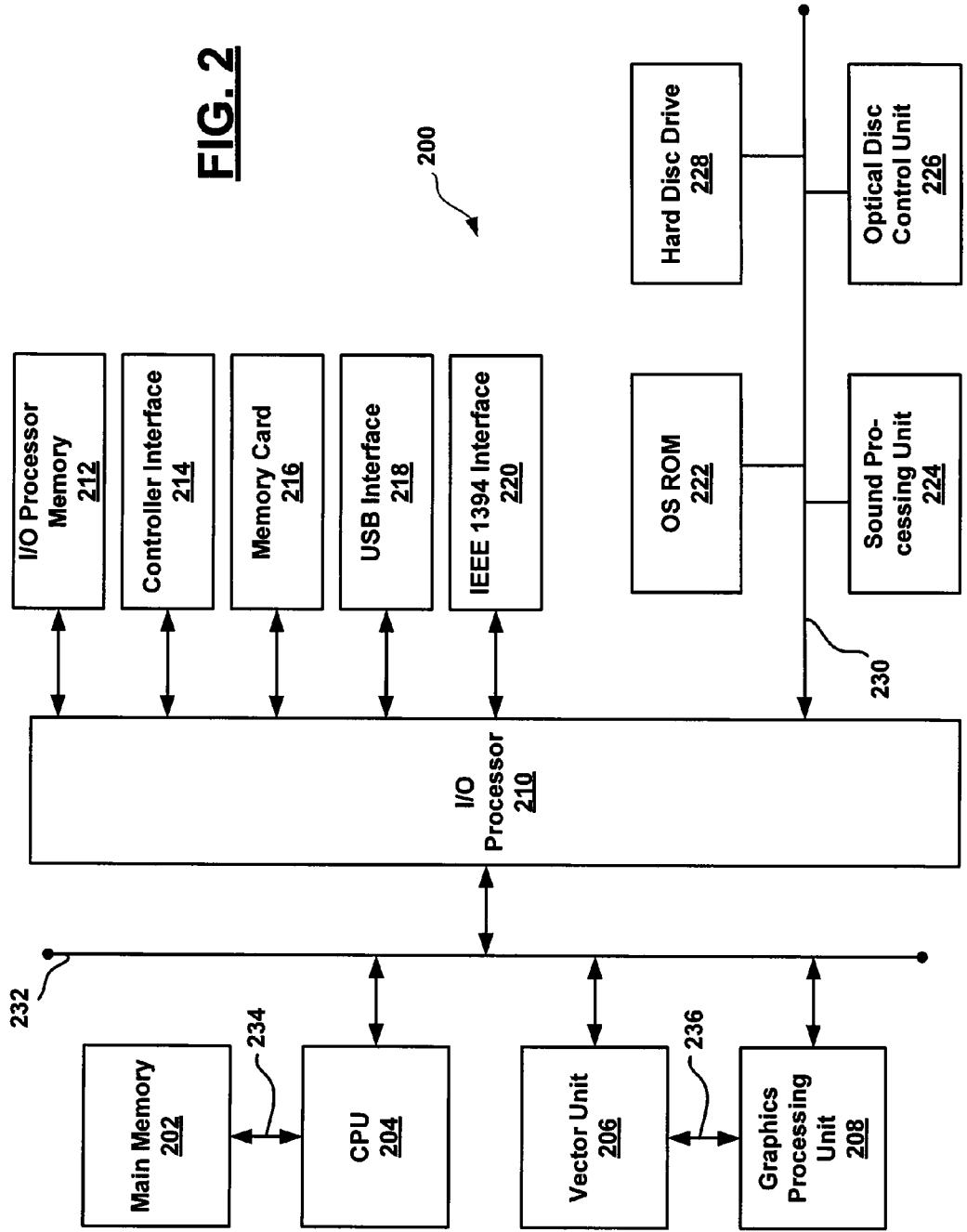

US 9,044,675 B2

AUTOMATED VIDEO GAME RATING

TECHNICAL FIELD

The present disclosure relates generally to electronic games, and more specifically, to systems and methods for rating and recommending electronic games.

BACKGROUND

Electronic, or video games, are proving to be an important industry, with billions of dollars spent by consumers on their purchase and countless hours playing them. To guide consumers in their purchase, various rating schemes have been devised. Typically, these involve affirmative questioning of the users, and the use of their explicit input. Unfortunately, such an approach inevitably imports the biases of the users, and can lead to inaccurate or irrelevant ratings, because not all users are equally situated, and because haste, and sometimes deliberate dishonesty, factor into the rating session.

OVERVIEW

As described herein, an automated rating system for an electronic, or video game includes a collector configured to collect game data pertaining to the game and to collect implicit user data pertaining to one or more users, a rating processor configured to rate the game based on the collected game data and implicit user data, and a recommender configured to provide a recommendation as a function of the operation of the game rating.

Also as described herein, a method for automatically rating an electronic game includes collecting game data pertaining to the electronic, or video game, collecting implicit user data pertaining to one or more users, rating the game based on the collected game data and implicit user data, and providing a recommendation of the game as a function of the rating.

Also as described herein, a system for automatically rating an electronic, or video game includes means for collecting game data pertaining to the game, means for collecting implicit user data pertaining to one or more users, means for rating the game based on the collected game data and implicit user data, and means for providing a recommendation of the game as a function of the rating.

Also as described herein, a program storage device readable by a machine, embodying a program of instructions executable by the machine to perform a method for automatically rating an electronic game, the method including collecting game data pertaining to the electronic game, collecting implicit user data pertaining to one or more users, rating the game based on the collected game data and implicit user data, and providing a recommendation of the game as a function of the rating.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 1 is a schematic diagram of a gaming system 100 that includes one or more game consoles 102 each connected to a display 104 and to one or more game controllers 106 or the like;

FIG. 2 is a block diagram of example game console 102 of FIG. 1;

DESCRIPTION OF EXAMPLE EMBODIMENTS

Figure 1:
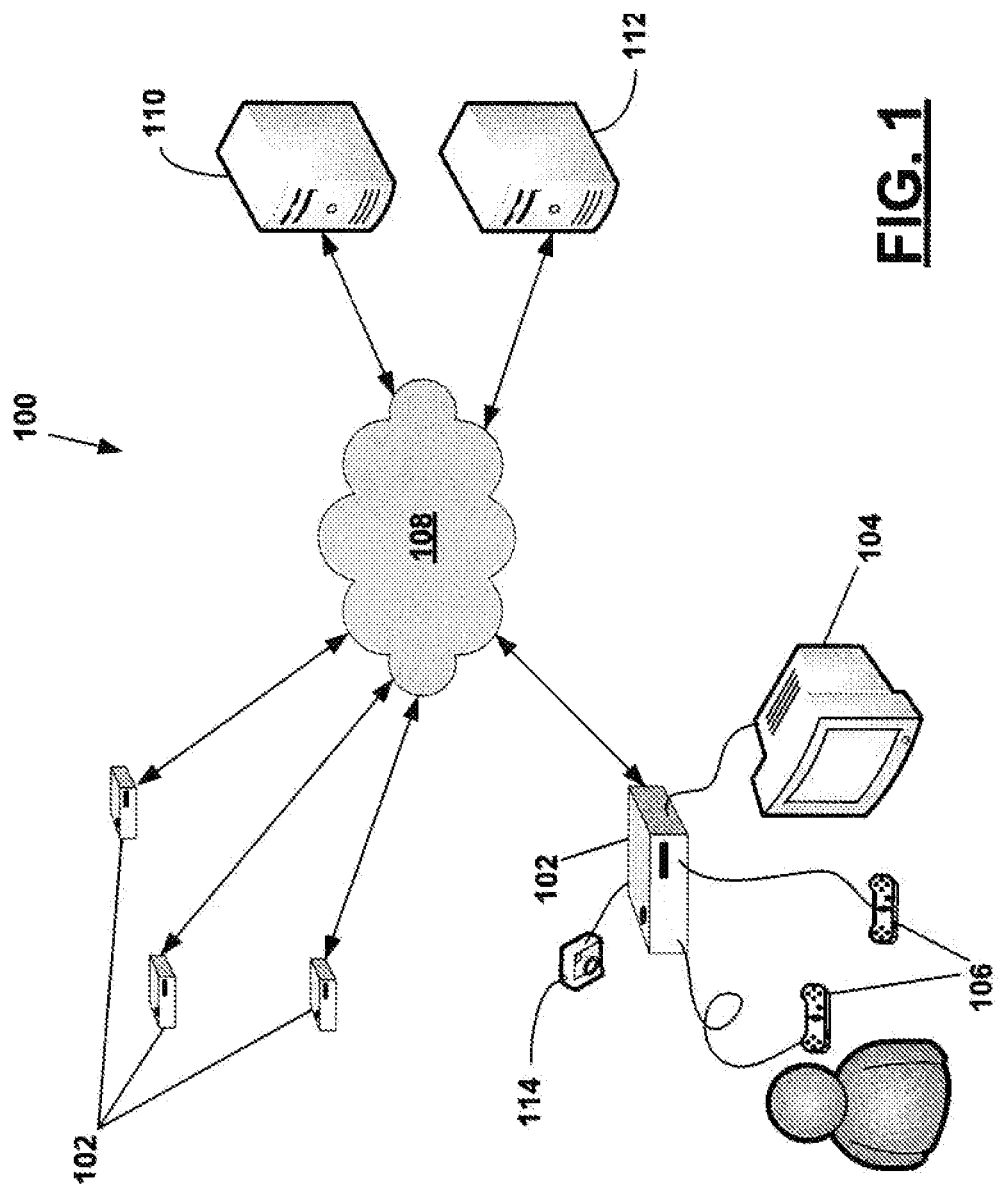

Example embodiments are described herein in the context of a system of computers, servers, and software. Those of ordinary skill in the art will appreciate that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

When considering whether to purchase or play an electronic game (i.e., "video game"), a user will often first review its ratings by other players and base his decision on their opinions as reflected in these ratings. However, other players intentionally or unintentionally import their own biases into ratings. These biases may or may not accurately map to the user's own situation. To account for these biases, or substantially avoid them, an arrangement as described herein formulates assessments of a video game automatically, without, or substantially without, affirmatively soliciting players' opinions.

Factors that can skew ratings and influence their relevance include age, gender, and experience level, along with characteristics of the game, such as the type of game, its length, graphics intensity, platform (self-contained console, Internet gaming) on which the game is played, and so on. As an example, a 40 year-old man looking to purchase a puzzle-solving game for the first time may not be interested in puzzle-solving game ratings by a 14 year-old girl with even extensive gaming experience, particularly if her experience primarily relates to first-person-shooter games. Similarly, the man's experience with puzzle-solving games played on a general purpose laptop computer may be of little value to a purchaser of a graphics-intensive game to be played on a powerful, dedicated desktop computer.

FIG. 1 is a schematic diagram of a gaming system 100 that includes one or more game consoles 102 each connected to a display 104 and to one or more game controllers 106 or the like. The display 104 may be a CRT (cathode ray tube), FPD (flat panel display) or similar visual output, or similar device configured to graphically display objects on a screen, or to project objects on a surface such as a wall, as is known in the art. As explained in more detail below with respect to FIG. 2, the console 102 may include a local processor or similar processing hardware of suitable computational capacity, coupled to other support components such as dedicated co-processors, storage memories, readable media drives, buses, I/O controllers, network interfaces, and the like, as necessary. Console 102 may optionally be connected, wirelessly or over a network 108 (for example the Internet), to one or more game servers 110 disposed at a location remote from the console, to conduct information exchange therewith according to known protocols so that an online gaming session can be executed. Console 102 is also shown connected to a rating server 112 for conducting information collection, collation, aggregation and the like, as detailed below.

It is also contemplated for console 102 to be a free-standing device requiring no network connections, particularly for gaming, with the gaming software being run exclusively on the local processor therein. Such operation is referred to as stand-alone gaming, to be distinguished from online gaming. It is also contemplated to connect console 102 with other, local devices, for example other consoles, either directly or through local or other networks.

Figure 1A:
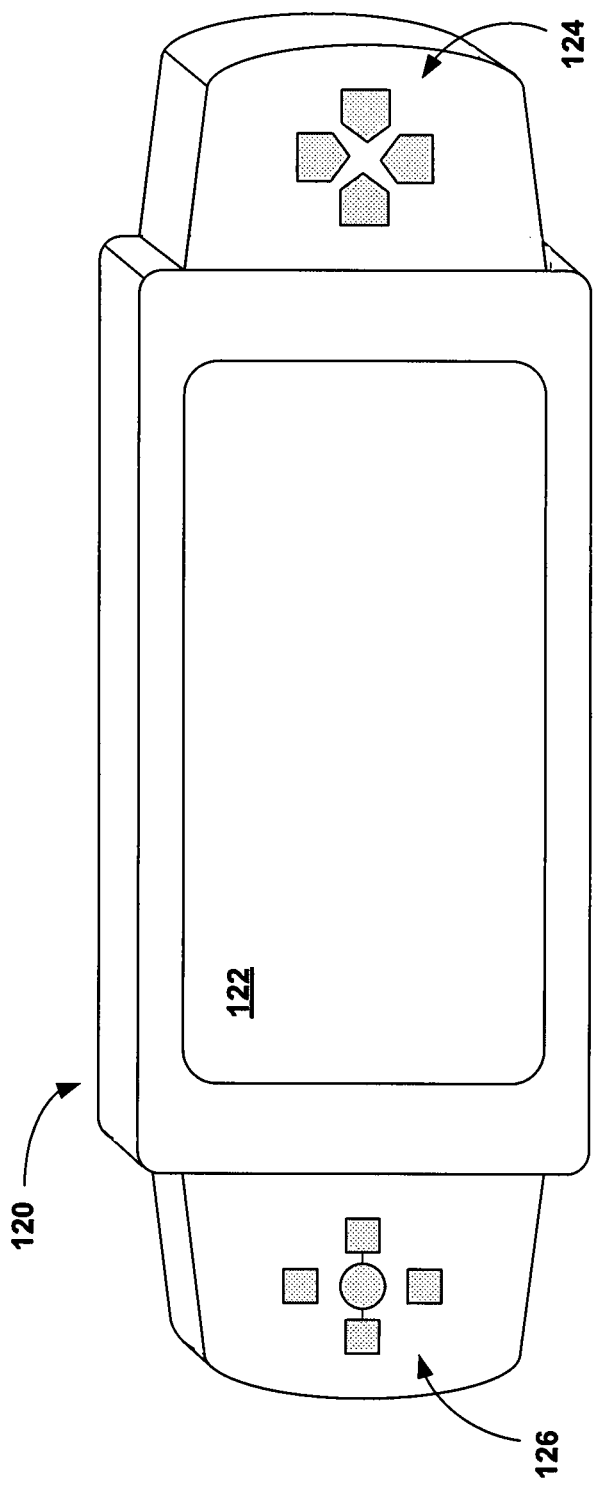
FIG. 1A is a schematic diagram showing a portable gaming device 120.

In addition, as shown in FIG. 1A, the system can take the form of a portable gaming device 120 in which the gaming software is resident on the device or a persistent storage medium (for example flash memory device) that is coupleable to the device. The device 120 includes a display 122, right-side control buttons 124, and left-side control buttons 126. Rating information can be collected on the device 120 and/or stored for real-time or subsequent downloading, via a wireless link for example, to a remote rating sever such as server 112 (FIG. 1).

FIG. 2 is a block diagram of a console 102, shown to include a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE 1394 interface 220, although other bus standards and interfaces may be utilized. Console 102 further includes an operating system read-only memory (OS ROM) 222, a sound processing unit 224, an optical disc control unit 226, and a hard disc drive 228, which are connected via a bus 230 to the I/O processor 210. While the console is described as a dedicated "stationary" gaming device, it may alternatively be implemented as a general-purpose computer, a set-top box, a cellular telephone, or a hand-held, portable or mobile gaming device. Further, similar entertainment systems may contain more or less operating components. A user of the console 102 provides instructions via the controller interface 214 to the CPU 204. For example, the user may instruct the CPU 204 to store certain game information on the memory card 216 or instruct a character in a game to perform some specified action. Other devices may be connected to the console 102 via the USB interface 218 and the IEEE 1394 interface 220. Games may be obtained from sources such as server 110, from which they can be downloaded onto the console 102 over the Internet for example, or they may be obtained through a tangible storage medium, such as an optical disc or flash memory on which the games are stored. Alternatively, the games may be obtained wirelessly through a cellular network, for instance.

Returning to FIG. 1, it also shows a camera 114 that may be separate or integral with console 102. Camera 114 operates to observe the player 116 during play, triggered to turn on when game play commences for instance. Facial recognition software, provided in camera 114 or console 102, or even on a remote server such as rating server 112, serves to register various facial expressions and other behaviors of the player, in real time as the game is played. Expressions that can be registered include grins, grimaces, frowns, face contortions, looks of anger or astonishment, and the like. Each such expression is assigned a value that indicates a positive or negative experience and the degree of that experience at a particular point in game play. The values can be sent to ratings server 112 through the network 108 or stored on the console 102 for sending at a later time when the conditions of network 108 are more appropriate or the game deems more appropriate.

Other observational player data can also be collected. For instance, a sound recorder, integral with camera 114 and/or console 102, can be used for voice recognition, to determine when expletives are used or when sounds or tones of contentment, triumph, anger or excitement are uttered. These incidents, measured in real time commensurately with game play, are also assigned various values indicative of their positive or negative nature and their degree. A user may shout "Hooray!" triumphantly upon defeating a foe in the game, for instance, and this can be detected and assigned a high positive value. Alternatively, the user can shout an expletive, which, if under expected circumstances, such as upon losing a life, may be assigned one negative value, while if under unexpected circumstances, as in uneventful game play, may be assigned a higher negative value as it may indicate boredom or lack of challenge or excitement. Other observational player data can include body position and posture and changes therein, along with various physical actions, such jumping up suddenly, flinging motions, and so forth.

Other player data can be acquired using devices that are built into the game controller 106. For instance, a motion sensor or accelerometer (not shown) can be used to register sudden accelerations, as when the player is flinging down the game controller in frustration, or beating it once or repeatedly. In addition, the game controller 106 can be configured to collect biometric data, such as player heart rate or hand or finger sweating, for example. Sensors for performing such biometric data collection are well known and can readily be incorporated into the game controller 106. Alternatively, they can be separate components that independently relay their information to the ratings server 112.

The above player data is inadvertent or implicit in nature, in the sense that the player is not affirmatively asked how he or she feels about the game or various aspects of the game, and can be referred to as implicit data. This is not intended to be a limitation, as affirmative querying is also contemplated, to obtain what may be referred to as explicit data. Affirmative querying, however, can be weighted differently from the inadvertently-acquired player data, as it may introduce an element of dishonesty, intentionally or otherwise (by virtue of unconscious biases). Basic querying can involve asking the player's age and gender, or accessing these from storage from previous sessions with the instant game or previous games or encounters, or other databases such as those of social networks and the like. Alternatively or in addition, server 112 can be configured to track the player's experience in the instant game, or in other related games, or other non-related games, for suitable weighting as detailed below.

A non-exhaustive list of game and game level characteristics that can be tracked can be game type-dependent and can include, from Table 1:

TABLE 1

First person shooter:

Number of shots fired into an enemy
Accuracy of shots
Frequency of weapon switching
Percentage of time spent with easier weapons (shotgun) over hard weapons (pistol)
Driving game:

Percentage of time spent braking on a lap
Percentage of time spent on the accelerator
Number of spin outs
Number of collisions with walls and other objects surrounding the track
Number of collisions with other cars
Percentage of time spent off the racing line
Percentage of time in the wrong gear
Lap times
Number of times in the pit for the race
Fantasy game (RPG):

Percentage of time spent using each spell
Percentage of time spent using each weapon
Average time spent engaged in melee with enemies
Average time spent using spells with enemies
Average time spent using spells on self
Number of times killed by specific enemies
Number of times used shield to block enemy attacks
Accuracy of projectile spells hitting enemies
Accuracy of projectile weapons hitting enemies
Party/Casual game:

Accuracy of tasks performed
Percentage of hits versus misses
Average reaction speed to each task A non-exhaustive list of player characteristics that can be tracked includes, from Table 2:

TABLE 2

Hair style recognized (large, long, afro, bald)
Hair color
Facial hair recognized
Wears glasses
Color of clothing
Has an eye patch
Wears earrings
Wears facial jewelry (nose rings, etc)

TABLE 2-continued

The number of settings the player has customized
The input controllers the player uses (motion controller, regular game controller, Bluetooth ™ remote, steering wheel, etc)
Whether the player uses headsets, headphones, microphones, etc.
Average time spent playing games per day
The types of games the player spends most time playing
Average speed at navigating on screen menus A non-exhaustive list of player behaviors that can be observed and tracked includes:

TABLE 3

Temperature of the player's hands or face or other body parts (via an infra red camera for instance) as signs of stress, frustration or anger
Player's gaze time for how bored they are to what is displayed on screen
Types of reviews or ratings posted (could be in game or online via Amazon.com, etc.)
Recognized body positions during play (lying down, standing, sitting, etc) for whether they are relaxed, bored or excited.

Other user data collected can relate to geographic location. This can be obtained for instance by analyzing IP addresses or by using GPS coordinates. Geographic information can even be used to point to cultural differences in players. Further, geographic data may be categorized. The type of games that are played while riding busses, trains or cars, or waiting in lines at a bank or at a bus stop can be tracked, based on geographic data, which can vary while the game is played. Also, indoor vs. outdoor game playing can be tracked, either geographically or using appropriate sensors, such as natural/sunlight detectors, provided for example on a portable gaming device. The geographical inference can even be resolve to the particular type of indoor room in a house or mall, or whether the player is seated at a desk, standing up in front of a TV, or reclining on a couch. Such information can elucidate player behavior and help match players to each other.

Another metric that can be tracked is player tenacity/determination. This is the player's propensity to change games or abandon a game if he or she is not succeeding. The information relating to tenacity/determination can be clustered, as further explained below. For instance, there may be a group of dedicated players who will select the most difficult or challenging levels and, in spite of repeated failures, still play the game. Such a level of tenacity can be contrasted to a player who is failing (but keeps trying) at the lowest difficulty setting. They are both determined gamers, even though one may be a more skilled player than the other and might choose different games as a result.

Some or all of the above data, along with other data, can be implicitly or explicitly collected and sent to rating server 112. In turn, rating server 112 applies clustering algorithms and techniques to achieve user-specific ratings for the games and levels (segments) of the game. The ratings can be based on game/game level to game/game level similarities, user to user similarities, or game/game level to user similarities, for instance.

Figure 3:
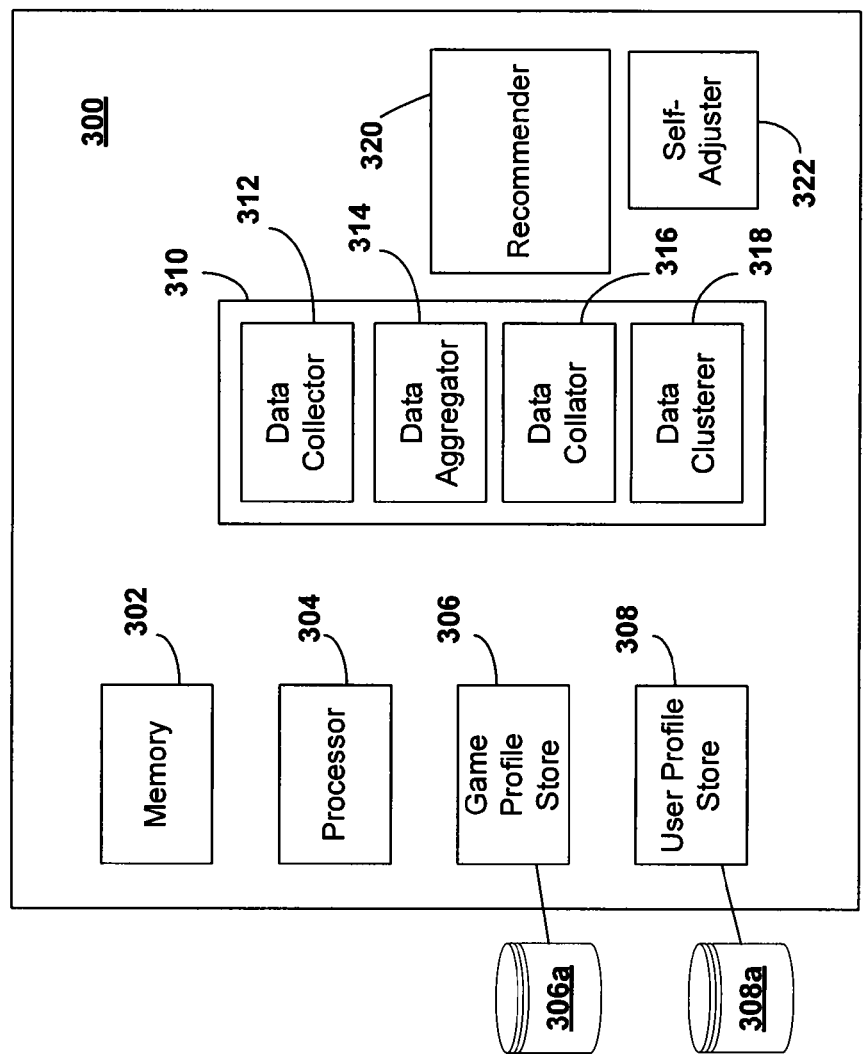
FIG. 3 is a block diagram of an automated rating system 300.

FIG. 3 is a block diagram of an automated rating system 300, implemented for example by a server such as rating server 112 and other components, which operates to collect, collate, aggregate and cluster user data and game rating data associated with games that can be played on console 102 or another gaming device. It will be appreciated that while referred to in the singular as a "server," device 112 can be comprised of multiple separate components housed in one or more chassis or frames, including different computing systems, data storage systems, and the like.

In pertinent part, rating server 112 includes a memory 302, a processor 304, a game profile store 306 with associated database 306a, and a user profile store 308 with associated database 308a. Also included is a rating processor 310 having a collector 312, aggregator 314, collator 316 and clusterer 318. Rating server 112 also includes a recommender 320. Collector 312 serves to obtain game and game level characteristic data, for example as listed above in Table 1, for storage in game profile database 306a. Some of the game and game level characteristics can be provided a priori to the system and relate to various game attributes—that is, type of game (first person shooter for example), number of levels, number of lives per game and/or per level, etc. Other characteristics relate to the specific player's performance during game play—number of vehicle collisions, number of bullets or missiles fired, time spent on each game segment and overall, number of levels reached, premature game end (i.e., user quit in frustration), etc. Collector 312 also obtains player characteristic and behavior data, as listed in Tables 2 and 3 for example, for storage in user profile store 308a. Records pertaining to individual games, and, optionally, segments of games, are generated from the collected and stored data and kept in game profile store 306. Similarly, records pertaining to individual players or users individually or as relating to the particular game are generated from the collected and stored data and kept in user profile store 308.

Figure 4:
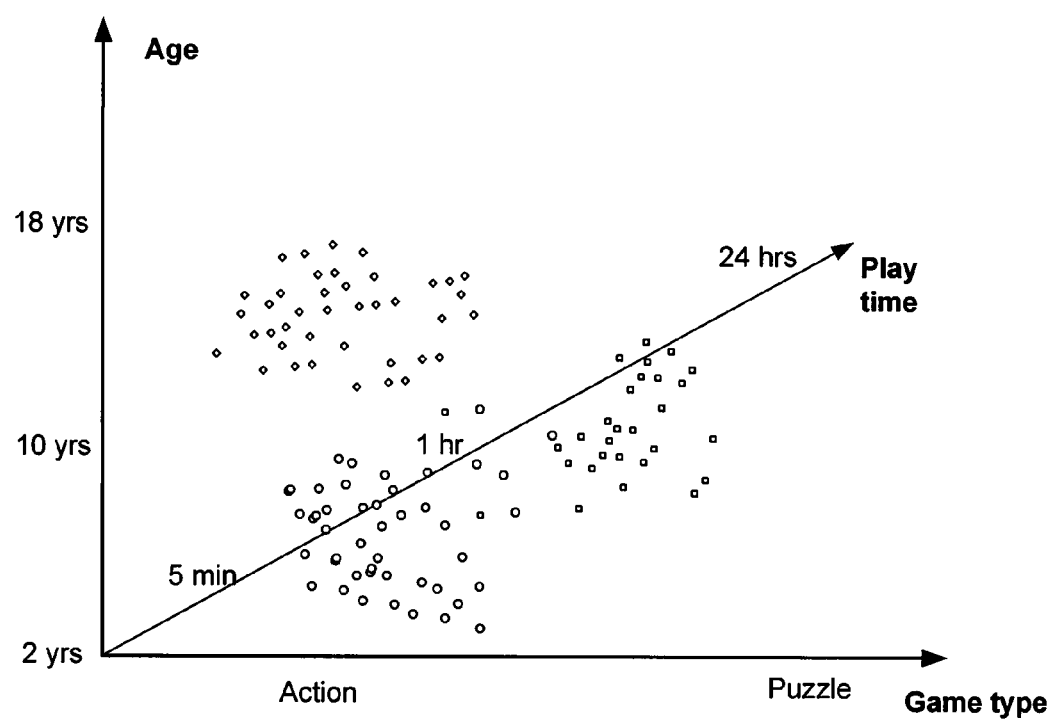
FIGS. 4 and 4A are graphical representations of clustering mappings.

Aggregator 314 compiles the game and player data associated with the records in game profile store 306 and user profile store 308 and, along with collator 316, collates this information and passes it to clusterer 318 to perform clustering in accordance with known algorithms. The outcome of the clustering, an example of which is shown in FIG. 4, yields various classifications that are used to provide game recommendations by recommender 320. Clusterer 318 classifies the collated data according to various combinations of user attributes and game characteristics, using known clustering algorithms. Identified clusters (grouping of sample points above statistical average) within different dataset combinations are used by the recommender 320 to derive a recommendation/rating. The recommender 320 takes limited data from either new users, or existing users who are new to a game, and generates a rating by finding a correlation between the clusters on the new limited data and cluster data stored on the server. The generated rating is compared to previous ratings from other users with similar attributes and can be used by the recommender 320 to make a positive or negative recommendation on whether the new user would like the game, find it difficult to play, etc.

Figure 4A:
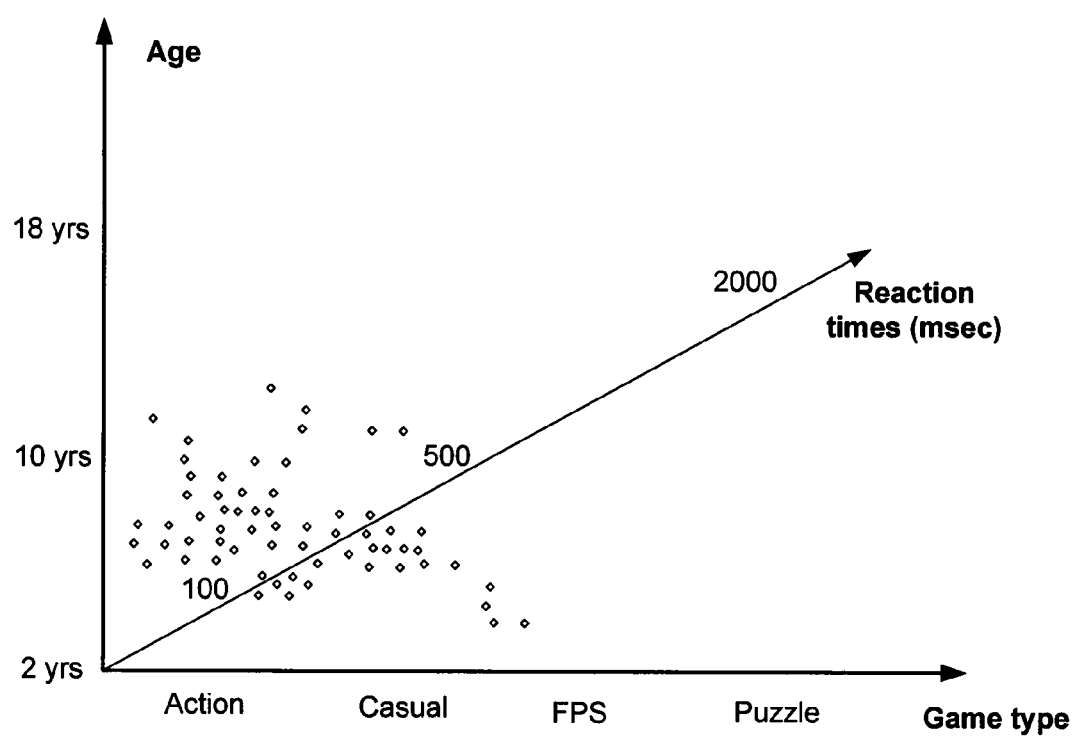

For example, with reference to FIG. 4, there is shown a cluster of young users (teenagers) marked with diamond symbols in the diagram, indicating their propensity for action games that are less than one hour long. A new user who is a teenager and shows a propensity for less than one hour long games can then be recommended action games based on this graph. In FIG. 4A, we see the graph of reaction times of users of different ages within various game types. We can see from FIG. 4A that a cluster of young users (child to teen) have quick reaction times (low reaction values) for action and casual games. From the two combinations of data sets of FIGS. 4 and 4A, it can be deduced that a 15-yr old who plays casual games might like playing action games (FPS, etc.), because of his/her quick reaction times. Additional combination data sets can be used to narrow down specifically if a new user would like one action game over another. Thus it will be appreciated that cluster data overlaps into different spaces (where spaces are a combination of user attribute and game characteristics). Importantly, specific rules about user attributes or game characteristics (or other metrics) need not be expressly articulated. Rather, with enough data, clusters will statistically form and overlap, leading to automatic deductions of associations from which recommendations can be derived. Further, while shown in FIGS. 4 and 4A in plots having three axes, this for ease of illustration only, and the clusters can in fact be tracked by the rating server 112 in axes or dimensions that are greater than three. Moreover, it should be noted that clustering is only one contemplated form of data mining; other forms of data mining algorithms exist that can help classify gamers, games, and the cross-correlation between them.

Figure 5:
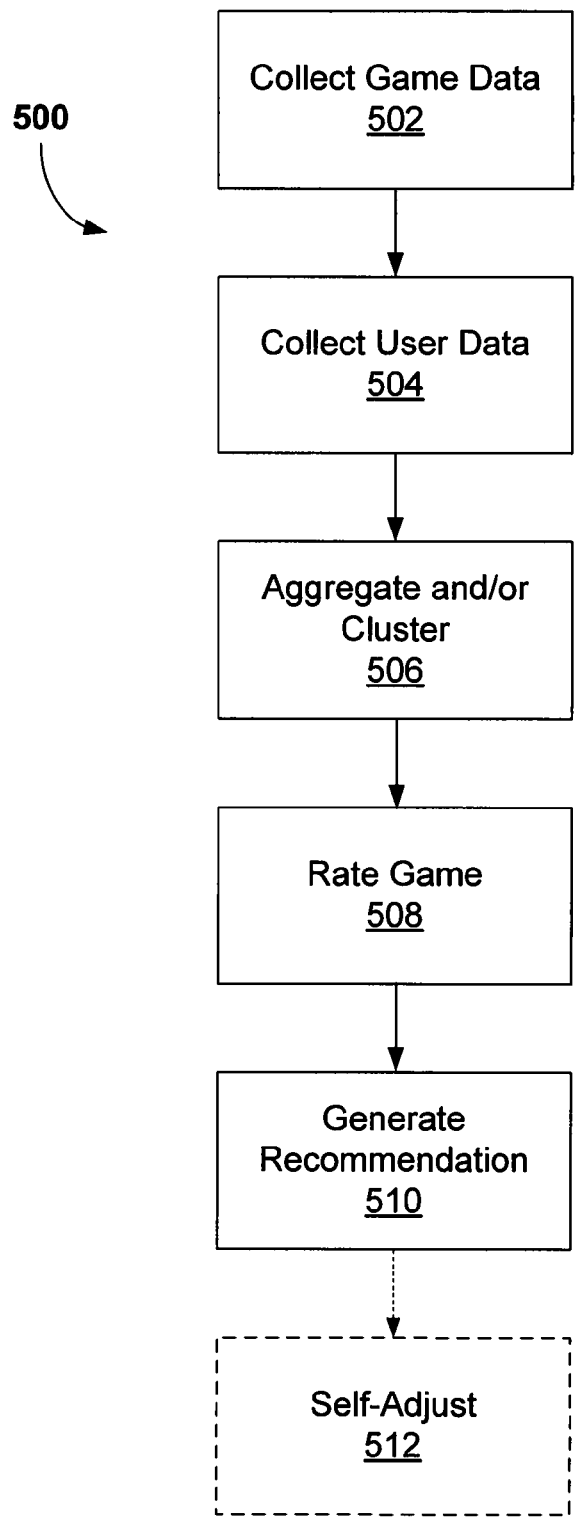
FIG. 5 is a flow diagram of a method 500 for automatically rating an electronic, or video game.

Thus as described herein, a method 500 for automatically rating an electronic game is shown in FIG. 5, in which, at 502, game data pertaining to an electronic game is collected. At 504, implicit user data is collected. At 506, aggregating and/or clustering is performed. At 508, the game is rated based on the collected data and the aggregation and clustering thereof, and at 510, a recommendation is generated. Then, optionally, at 512, self-adjustment of the game is conducted as described above.

Figure 6:
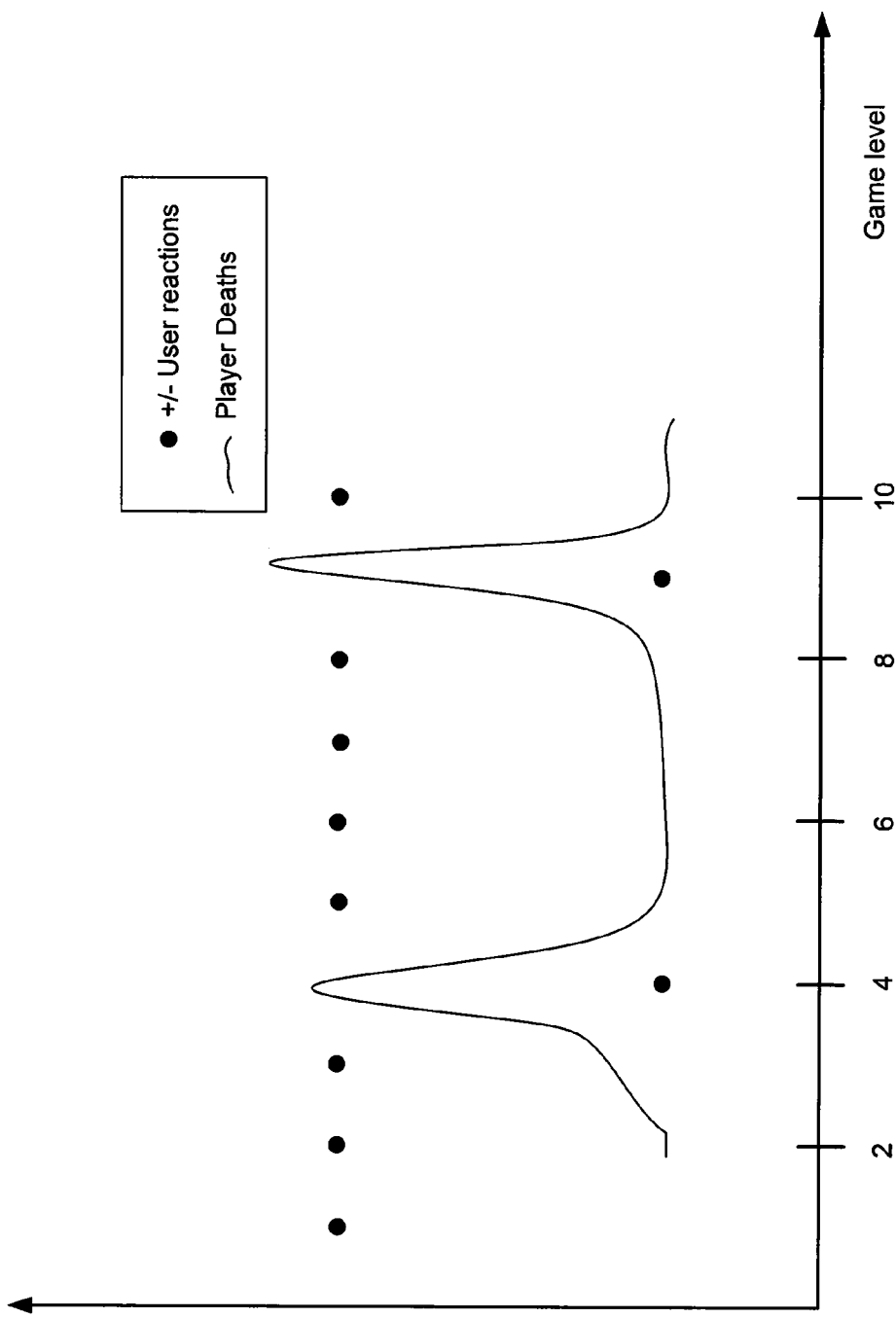
FIG. 6 is a graphical representation of clustering mappings relating to the use of implicit user behavior used to rate a game's difficulty.

It is to be understood that other applications are contemplated for the automated user gaming system as described herein. Turning to FIG. 6, it can be seen that implicit user behavior can be used to rate a game's difficulty. For example, for a particular game, we see a graph in which the number of positive and negative user reactions over a set of 10 levels is plotted, with the x axis pertaining to the game levels 1-10, and the y axis pertaining to −1 to +1 scale of user reactions as inferred through any of the methods described above. From the graph it is clear that levels 1-3, 5-8 and 10 received increasing positive signals, but levels 4 and 9 had a negative rating. This graph can be either combined with a plot showing the average number of player deaths per level, or these two parameters can be plotted on separate graphs. In either case a correlation appears, in which high player deaths on levels 4 and 9 correlate to the overly negative user reactions. Thus, using this information (gathered from multiple users automatically as described above), a game designer can refine the game to improve the difficulty of levels 4 and 9 for a future downloadable update to the game. Alternatively or in addition, the game can be programmed to refine itself and adjust its length, or difficulty—for example to make levels 4 and 9 less difficult—or any other attributes, in accordance with the collected data and/or rating and recommendation results. This can be accomplished using a self-adjuster 322 in FIG. 3.

It should be noted that the outcome of the above processing, and particularly the recommendation component, can be integrated into social networking sites. For instance, at the completion of game play, the game can inform the player that certain friends—that is, members of the same social networking site—may similarly be interested in the same game, based on an assessment of the players performance, behavior, and so forth. In particular, patterns of behavior are inferred by tracking the player and his/her friends, and matching a game to specific friends.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. An automated rating system for an electronic game comprising:
   a detector;

a collector configured to:
collect game data pertaining to the electronic game,
collect explicit user data,
collect, during game play, implicit user data pertaining to one or more users,
wherein at least one of said collecting explicit user data or collecting implicit user data comprises using the detector to output a signal in response to explicit or implicit user behavior or attributes,
evaluate the collected implicit user data as a function of expected circumstances,
wherein the collected user data pertains to user response, said evaluation comprising assigning one value to a user response under one circumstance and assigning a different value to the same user response under another, different circumstance, and
weight the implicit user data differently from the explicit user data;
a rating processor configured to rate the game based on the collected game data and implicit user data; and
a recommender configured to provide a recommendation as a function of the operation of the game rating.

2. The system of claim 1, wherein the rating processor is configured to perform a clustering algorithm from which said rating is derived.

3. The system of claim 1, wherein the game data pertains to the type of game.

4. The system of claim 1, further comprising a self-adjuster configured to adjust an attribute of the electronic game in accordance with collected data or rating or recommendation results.

5. The system of claim 1, wherein the implicit data relates to player tenacity.

6. An automated rating system for an electronic game comprising:
a detector;
a collector configured to:
collect game data pertaining to the electronic game,
collect explicit user data,
collect, during game play, implicit user data pertaining to one or more users,
wherein at least one of said collecting explicit user data or collecting implicit user data comprises using the detector to output a signal in response to explicit or implicit user behavior or attributes,
evaluate the collected implicit user data as a function of expected circumstances,
wherein the collected implicit user data pertains to user response, said evaluation comprising assigning one value to a user response under one circumstance and assigning a different value to the same user response under another, different circumstance, and
weight the implicit user data differently from the explicit user data;
a rating processor configured to rate the game based on the collected game data and implicit user data; and
a recommender configured to provide a recommendation as a function of the operation of the game rating,
wherein the implicit data includes biometric information.

7. An automated rating system for an electronic game comprising:
a detector;
a collector configured to:
collect game data pertaining to the electronic game,
collect explicit user data,
collect, during game play, implicit user data pertaining to one or more users,
wherein at least one of said collecting explicit user data or collecting implicit user data comprises using the detector to output a signal in response to explicit or implicit user behavior or attributes,
evaluate the collected implicit user data as a function of expected circumstances,
wherein the collected implicit user data pertains to user response, said evaluation comprising assigning one value to a user response under one circumstance and assigning a different value to the same user response under another, different circumstance, and
weight the implicit user data differently from the explicit user data;
a rating processor configured to rate the game based on the collected game data and implicit user data; and
a recommender configured to provide a recommendation as a function of the operation of the game rating,
wherein the implicit data includes observational data of the user.

8. The system of claim 7, wherein the observational data relates to one or more of temperature, gaze time and body position.

9. An automated rating system for an electronic game comprising:
a collector configured to:
a detector;
collect game data pertaining to the electronic game,
collect explicit user data,
collect, during game play, implicit user data pertaining to one or more users,
wherein at least one of said collecting explicit user data or collecting implicit user data comprises using the detector to output a signal in response to explicit or implicit user behavior or attributes,
evaluate the collected implicit user data as a function of expected circumstances,
wherein the collected implicit user data pertains to user response, said evaluation comprising assigning one value to a user response under one circumstance and assigning a different value to the same user response under another, different circumstance, and
weight the implicit user data differently from the explicit user data;
a rating processor configured to rate the game based on the collected game data and implicit user data; and
a recommender configured to provide a recommendation as a function of the operation of the game rating, wherein the implicit data relates to geographic information.

10. An automated rating system for an electronic game comprising:
a detector,
a collector configured to:
collect game data pertaining to the electronic game,
collect explicit user data,
collect, during game play, implicit user data pertaining to one or more users,
wherein at least one of said collecting explicit user data or collecting implicit user data comprises using the detector to output a signal in response to explicit or implicit user behavior or attributes,
evaluate the collected implicit user data as a function of expected circumstances,
wherein the collected implicit user data pertains to user response, said evaluation comprising assigning one value to a user response under one circumstance and assigning a different value to the same user response under another, different circumstance, and weight the implicit user data differently from the explicit user data;

a rating processor configured to rate the game based on the collected game data and implicit user data; and a recommender configured to provide a recommendation as a function of the operation of the game rating, wherein the implicit data relates to any one or more of hair color, facial hair, wearing eye glasses, color of clothing, wearing eye patch, wearing earrings, wearing facial jewelry, number of customized settings, type of input controller used, headset use, average daily playing times, average daily movie watching time, and average menu navigation speed.

11. A method for automatically rating an electronic game comprising:

collecting game data pertaining to the electronic game;

collecting explicit user data;

collecting, during game play, implicit user data pertaining to one or more users, wherein at least one of said collecting explicit user data or collecting implicit user data comprises using a detector operable to output a signal in response to explicit or implicit user behavior or attributes;

evaluating the collected implicit user data as a function of expected circumstances, wherein the collected implicit user data pertains to user response, said evaluation comprising assigning one value to a user response under one circumstance and assigning a different value to the same user response under another, different circumstance;

weighting the implicit user data differently from the explicit user data;

rating the game based on the collected game data and implicit user data; and providing a recommendation of the game as a function of the rating.

12. The method of claim 11, wherein the rating includes using a clustering algorithm.

13. The method of claim 11, wherein the implicit data includes biometric information.

14. The method of claim 11, wherein the implicit data includes observational data.

15. The method of claim 14, wherein the observational data relates to one or more of temperature, gaze time and body position.

16. The method of claim 11, wherein the game data pertains to the type of game.

17. The method of claim 11, wherein the implicit data relates to geographic information.

18. The method of claim 11, wherein the implicit data relates to any one or more of hair color, facial hair, wearing eye glasses, color of clothing, wearing eye patch, wearing earrings, wearing facial jewelry, number of customized settings, type of input controller used, headset use, average daily playing times, average daily movie watching time, and average menu navigation speed.

19. The method of claim 11, further comprising adjusting one or more game attributes in accordance with collected data or rating or recommendation results.

20. The method of claim 11, wherein the implicit data relates to player tenacity.

21. A system for automatically rating an electronic game comprising:

means for collecting game data pertaining to the electronic game;

means for collecting explicit user data;

means for collecting, during game play, implicit user data pertaining to one or more users, wherein at least one of said means for collecting explicit user data or collecting implicit user data comprises means for detecting explicit or implicit user behavior or attributes and outputting a signal in response thereto;

means for evaluating the collected implicit user data as a function of expected circumstances, wherein the collected implicit user data pertains to user response, said evaluation comprising assigning one value to a user response under one circumstance and assigning a different value to the same user response under another, different circumstance;

means for weighting the implicit user data differently from the explicit user data;

means for rating the game based on the collected game data and implicit user data; and means for providing a recommendation of the game as a function of the rating.

22. The system of claim 21, wherein the means for rating uses a clustering algorithm.

23. The system of claim 21, wherein the implicit data includes biometric information.

24. The system of claim 21, wherein the implicit data includes observational data.

25. The system of claim 24, wherein the observational data relates to one or more of temperature, gaze time and body position.

26. The system of claim 21, wherein the game data pertains to the type of game.

27. The system of claim 21, wherein the implicit data relates to geographic information.

28. The system of claim 21, wherein the implicit data relates to any one or more of hair color, facial hair, wearing eye glasses, color of clothing, wearing eye patch, wearing earrings, wearing facial jewelry, number of customized settings, type of input controller used, headset use, average daily playing times, average daily movie watching time, and average menu navigation speed.

29. The system of claim 21, further comprising a means for adjusting one or more game attributes in accordance with collected data or rating or recommendation results.

30. The system of claim 21, wherein the implicit data relates to player tenacity.

31. A program storage device readable by a machine, embodying a program of instructions executable by the machine to perform a method for automatically rating an electronic game, the method comprising:

collecting game data pertaining to the electronic game;

collecting explicit user data;

collecting, during game play, implicit user data pertaining to one or more users, wherein at least one of said collecting explicit user data or collecting implicit user data comprises a detector operable to output a signal in response to explicit or implicit user behavior or attributes;

evaluating the collected implicit user data as a function of expected circumstances, wherein the collected implicit user data pertains to user response, said evaluation comprising assigning one value to a user response under one circumstance and assigning a different value to the same user response under another, different circumstance;

weighting the implicit user data differently from the explicit user data;

rating the game based on the collected game data and implicit user data; and providing a recommendation of the game as a function of the rating.

32. The device of claim 31, wherein the rating includes using a clustering algorithm.

33. The device of claim 31, wherein the implicit data includes biometric information.

34. The device of claim 31, wherein the implicit data includes observational data.

35. The device of claim 34, wherein the observational data relates to one or more of temperature, gaze time and body position.

36. The device of claim 31, wherein the game data pertains to the type of game.

37. The device of claim 31, wherein the implicit data relates to geographic information.

38. The device of claim 31, wherein the implicit data relates to any one or more of hair color, facial hair, wearing eye glasses, color of clothing, wearing eye patch, wearing earrings, wearing facial jewelry, number of customized settings, type of input controller used, headset use, average daily playing times, average daily movie watching time, and average menu navigation speed.

39. The device of claim 31, wherein the method further comprises adjusting one or more game attributes in accordance with collected data or rating or recommendation results.

40. The device of claim 31, wherein the implicit data relates to player tenacity.

* * * * *